A. E. SMITH.
GOLF BAG HOLDER.
APPLICATION FILED APR. 23, 1918.
1,313,959.
Patented Aug. 26, 1919.
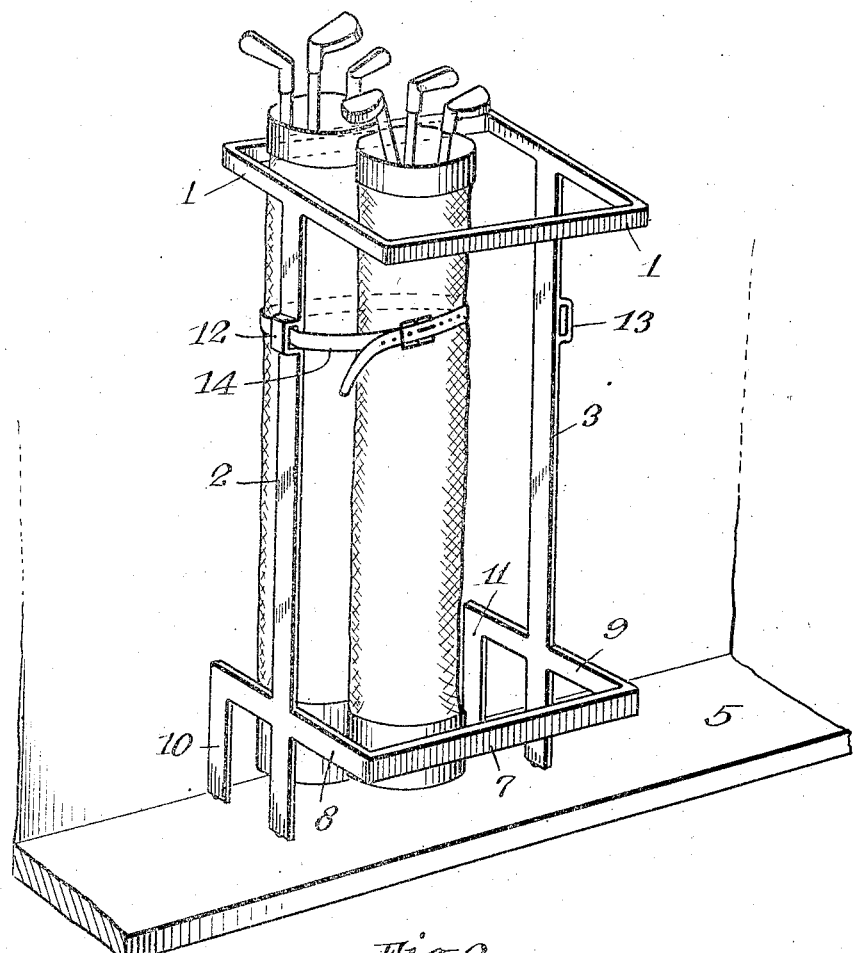
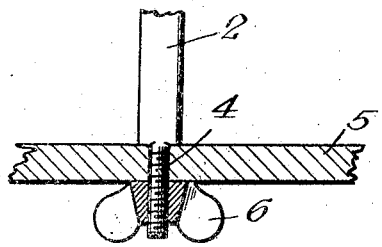
INVENTOR
Arthur E. Smith
BY
Townsend & Decker.

UNITED STATES PATENT OFFICE.

ARTHUR E. SMITH, OF NEW YORK, N. Y.

GOLF-BAG HOLDER.

1,313,959.　　　　Specification of Letters Patent.　　Patented Aug. 26, 1919.

Application filed April 23, 1918. Serial No. 230,219.

*To all whom it may concern:*

Be it known that I, ARTHUR E. SMITH, a citizen of the United States, and a resident of New York, in the county of New York and State of New York, have invented certain new and useful Improvements in Golf-Bag Holders, of which the following is a specification.

My invention has for its object the production of a simple, compact and strong device which shall be adapted to be detachably secured to the running board of an automobile and which shall be adapted to carry and hold securely one or more golf bags or similar objects.

When motoring, particularly over rough roads, golf bags, canes, umbrellas and analogous devices are extremely difficult to carry unless they are held securely by a person and if they are left on the seat of the automobile or the floor thereof, they are not only apt to become injured from their knocking against other objects on the sides of the automobile but the noise caused by their rattling and knocking about is very annoying. It was for the purpose of facilitating their carrying and to obviate their rattling or any injury to them when being carried that my present invention was devised.

The invention consists in the novel parts and combination of parts hereinafter more particularly described and then specified in the claim.

In the accompanying drawing:

Figure 1 is a perspective view of my improved device in operative position.

Fig. 2 is a section through the running board showing the means for detachably securing the device thereto.

Referring more particularly to both figures of the drawing:

1 indicates a frame, preferably metallic and of rectangular shape, having two vertical rods 2 and 3 secured to or integral with the sides thereof, each of said rods being provided with reduced screw-threaded extensions such for instance as is illustrated by 4 in Fig. 2 of the drawing. The screw-threaded extensions 4 are adapted to pass through holes in the running-board 5 of an automobile so that the device may be detachably secured thereto by suitable winged nuts as illustrated at 6.

7 indicates the front side of a supporting and strengthening frame having side members 8 and 9 preferably made integral with the vertical rods 2 and 3 and intersecting or joining said vertical rods at approximately the centers of said side members 8 and 9. The said side members 8 and 9 are provided with vertically extending rods 10 and 11 respectively which rods are also provided at their ends thereof, and in a manner similar to the vertical rods 2 and 3, with reduced screw-threaded extensions adapted to pass through the running-board 5 and to be held thereto by suitable winged nuts similar to that illustrated at 6.

12 and 13 indicate eyes attached to and preferably made integral with the vertical rods 2 and 3 respectively. When the holder is in use, that is when it is carrying one or more golf bags or analogous devices as illustrated in the drawing, a strap 14 is passed or threaded through one of the eyes as for instance, the eye 12, and is then passed or strapped around the bags and the ends thereof fastened together by means of a buckle or other suitable clasp. Thus the bags, whether there is one or more than one, may be held securely and firmly in the holder to prevent any injury thereto or any rattling of the golf clubs therein. When the device is not in use the strap 14 may be passed through both eyes 12 and 13 and the ends of the strap buckled together to prevent the strap from rattling.

As is obvious, my improved holder may be made in various sizes to meet varying conditions depending on the number of bags it is desired to carry although I prefer to make the holder of a size enabling it to conveniently accommodate four bags. It will be apparent also that the device by means of the winged nuts 6 may be easily and expeditiously attached to or detached from the running-board 5 whenever desired, and that no mutilation or special reconstruction of the automobile or parts thereof to carry the holder is necessary with the exception of four holes bored in the running-board adapted to receive the reduced threaded extensions of the vertical rods 2, 3, 10 and 11.

What I claim as my invention is:

In a holder, a frame, vertical rods attached to said frame and provided with screw-threaded extensions adapted to pass through holes in the running-board of an automobile, a strap or belt for securely fastening the contents of the holder, an eye on one of said vertical rods for carrying said strap or belt, a three-sided supporting frame attached to said vertical rods, vertical rods attached to said supporting frame and provided with screw-threaded extensions adapted to pass through holes in said running-board and nuts adapted to engage the extensions of said first-named vertical rods and the extensions of the vertical rods of said supporting frame for detachably holding the device in position on the running-board.

Signed at New York, in the county of New York and State of New York, this 22nd day of April, A. D. 1918.

ARTHUR E. SMITH.

Witnesses:
F. B. TOWNSEND,
EMIL FOERNSLER.